United States Patent
Durham et al.

(10) Patent No.: US 6,785,826 B1
(45) Date of Patent: Aug. 31, 2004

(54) SELF POWER AUDIT AND CONTROL CIRCUITRY FOR MICROPROCESSOR FUNCTIONAL UNITS

(75) Inventors: Christopher McCall Durham, Austin, TX (US); Peter Juergen Klim, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1158 days.

(21) Appl. No.: 08/682,471

(22) Filed: Jul. 17, 1996

(51) Int. Cl.[7] .............................. G06F 1/26; G06F 1/28; G06F 1/30
(52) U.S. Cl. ...................... 713/300; 713/320; 713/322; 713/324; 713/340
(58) Field of Search ........................ 395/750; 364/557; 713/300, 320, 322, 324, 340

(56) References Cited

U.S. PATENT DOCUMENTS

| | | | | |
|---|---|---|---|---|
| 5,392,437 A | * | 2/1995 | Matter et al. ................ | 395/750 |
| 5,418,969 A | * | 5/1995 | Matsuzaki et al. .......... | 395/750 |
| 5,452,277 A | * | 9/1995 | Bajorek et al. ........... | 369/53.18 |
| 5,452,401 A | * | 9/1995 | Lin ............................. | 395/750 |
| 5,495,617 A | * | 2/1996 | Yamada ....................... | 395/750 |
| 5,502,838 A | * | 3/1996 | Kikinis ........................ | 713/501 |
| 5,504,909 A | * | 4/1996 | Webster et al. ............. | 713/310 |
| 5,634,131 A | * | 5/1997 | Matter et al. ................ | 395/750 |
| 5,721,933 A | * | 2/1998 | Walsh et al. ................ | 713/300 |
| 5,852,370 A | * | 12/1998 | Ko ............................... | 326/81 |

FOREIGN PATENT DOCUMENTS

| | | |
|---|---|---|
| JP | 05-076128 | 3/1993 |
| JP | 07-28570 | 1/1995 |
| JP | 07-141321 | 6/1995 |

* cited by examiner

Primary Examiner—Frantz B. Jean
(74) Attorney, Agent, or Firm—Kelly K. Kordzik; Winstead Sechrest & Minick P.C.; Robert M. Carwell (57) ABSTRACT

A method and apparatus for reducing power dissipation within a functional unit of a microprocessor includes a power sensing circuit for sensing power dissipation of the functional unit. A low power mode identifying circuit identifies when the measured power dissipation of the functional unit exceeds a predetermined amount or value. Upon such a condition, a low power mode circuit operates the functional unit in a low power mode thereby reducing its power dissipation. Operation of the functional unit in the low power mode continues until the power dissipation reaches a safe level. The functional unit internally determines power dissipation and selectively enters a low power mode to reduce power dissipation of the functional unit. Low power mode operation of the functional unit reduces power dissipation of the functional unit.

14 Claims, 8 Drawing Sheets

SELF POWER AUDIT AND CONTROL CIRCUITRY FOR MICROPROCESSOR FUNCTIONAL UNITS

TECHNICAL FIELD OF THE INVENTION

The present invention relates to an apparatus and method for reducing power dissipation in microprocessors and, in particular, to self power audit and control circuitry for microprocessor functional units.

BACKGROUND OF THE INVENTION

Limiting power dissipation is one of the major goals when designing a microprocessor. Microprocessor power dissipation has substantially increased with the advent of new semiconductor technologies, increased density and complexity, and higher clock speeds.

Figure 1:
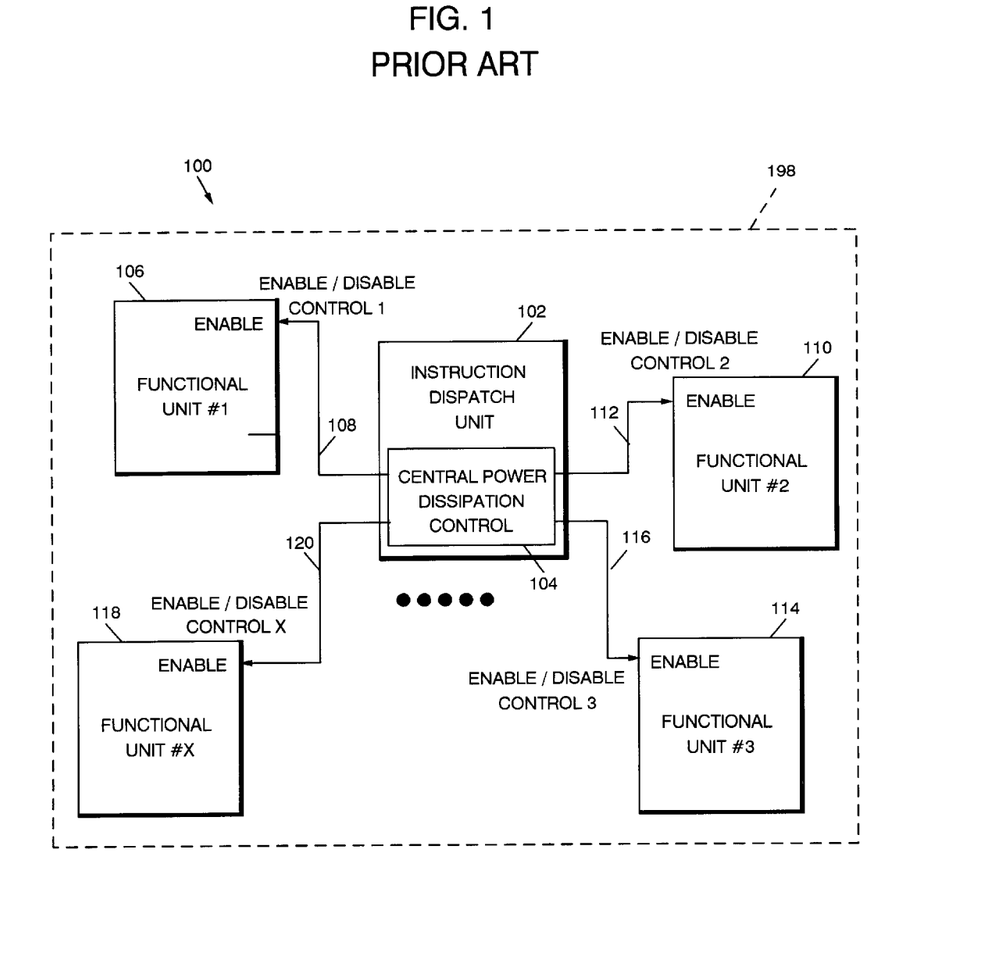
FIG. 1 illustrates a prior art system for enabling/disabling functional units.

Prior attempts at limiting power dissipation have generally centered around a central control unit that enables/disables functional units. Traditionally, power controlling systems enable/disable functional units from a central control block. FIG. 1 illustrates a prior art system 100. The system 100 includes a centralized instruction dispatch unit 102 having a central power dissipation control unit 104. The central power dissipation control unit 104 monitors usage of each functional unit 106, 110, 114 and 118 on an integrated circuit 198. One way of controlling power dissipation is to disable the functional unit when not in use, or when the forecast of the next N operations does not indicate the functional unit will be used in the near future. This is accomplished via the respective enable/disable control lines 108, 112, 116 and 120 for the appropriate functional unit desired to be disabled. When the functional unit is required for operation or is forecast to be necessary, the enable/disable control lines are enabled to operate the functional unit. This method, therefore, does not measure or utilize the power dissipation of the functional unit to determine when, and if, the functional unit should be disabled to prevent possible damage to the functional unit by overheating, etc. Furthermore, functional units that are intensively used, however, may never be disabled. As such, this particular method is not very effective in controlling power dissipation in this context.

A more complex method counts the number of contiguous cycles that the functional unit has been operational. After a given number of cycles, the functional unit is disabled for a period of time to "cool off". The number of contiguous cycles in operation may not be proportional to the power dissipation of the functional unit. Further, this method disables the functional unit for a defined period of time, thus, decreasing throughput of the functional unit.

In both of these methods, a central control unit monitors either forecasted usage requirements of the functional unit and/or tracks the number of contiguous cycles the functional unit is active. The only action taken by the central control unit is to disable the functional unit(s) via enable/control lines. As such, the central control unit itself must track all functional units.

Accordingly, there exists a need for an apparatus and method for self audit and control of power dissipation within a functional unit of a microprocessor. Further, there is needed an apparatus and method of internally determining power dissipation and selectively entering a low power mode of operation on a per functional unit basis to reduce power dissipation of the functional unit.

SUMMARY OF THE INVENTION

According to the present invention, there is provided a power audit and control circuit for monitoring power dissipation of a functional unit within a microprocessor. The power audit and control circuit includes a power sensing circuit located proximate the functional unit for measuring or estimating power dissipation of the functional unit. A low power mode identifying circuit receives the measured or estimated power dissipation of the functional unit and generates a low power mode enable signal when the measured or estimated power dissipation exceeds a predetermined amount. The power audit and control circuit further includes circuitry for controlling the power dissipation in the functional unit in response to the low power mode enable signal.

In accordance with the present invention, there is provided a method for reducing power dissipation in a microprocessor. The method includes the steps of measuring power dissipation of a functional unit within the microprocessor and comparing the measured power dissipation to a predetermined value. In response to the step of comparing, a low power mode enable signal is generated when the measured power dissipation exceeds the predetermined value. The power dissipation of the functional unit is thereafter controlled and/or reduced in response the low power mode enable signal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is made to the following description taken in conjunction with the accompanying drawings, wherein.

DETAILED DESCRIPTION OF THE INVENTION

With reference to the drawings, like reference characters designate like or similar parts throughout the drawings.

Figure 2:
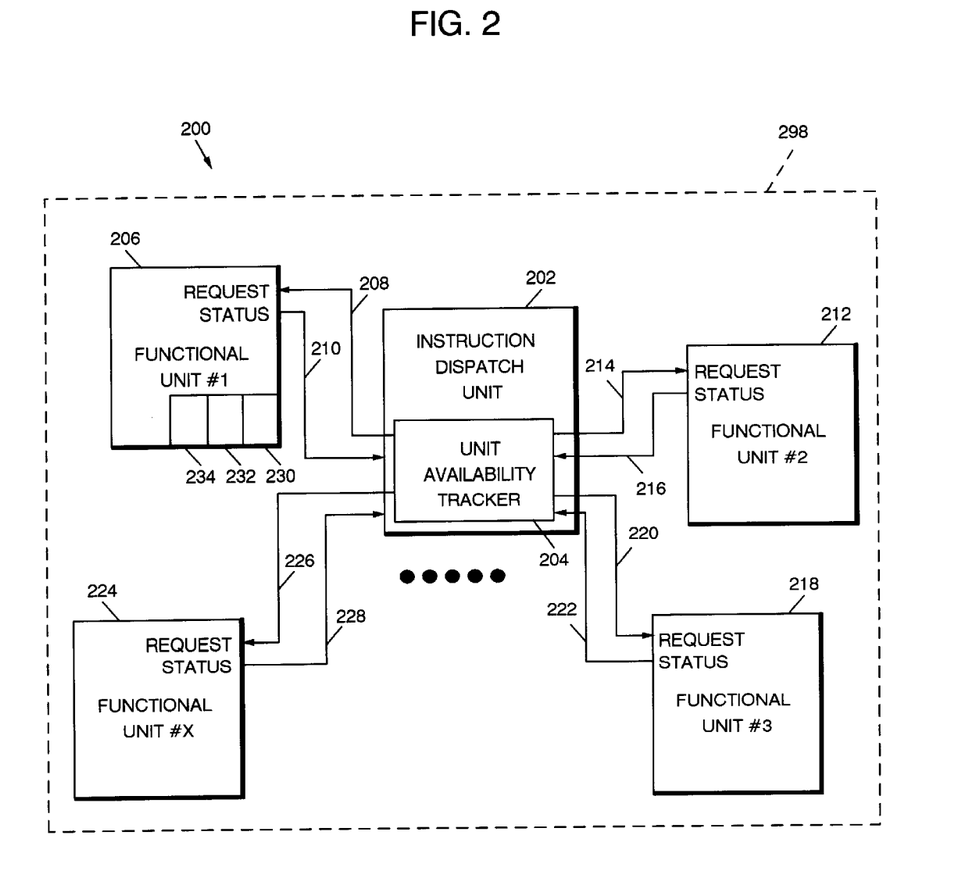
FIG. 2 is a block diagram of a power monitoring and controlling system in accordance with the present invention.

Now referring to FIG. 2, there is shown a power audit and control circuit 200 constructed on an integrated circuit 298. The integrated circuit 298 includes a plurality of functional units 206, 212, 218, 224 for performing operations or functions in response to an instruction or set of instructions. Each of the functional units 206, 212, 218, 224 interact with an instruction dispatch unit 202 through a unit availability tracker 204 that is part of the instruction dispatch unit 202. A two-way communication channel is provided between the instruction dispatch unit and each functional unit. As illustrated in FIG. 2, instruction dispatch unit 202 communicates with the functional unit 206 via a request line 208 and a status line 210, the functional unit 212 via a request line 214 and a status line 216, the functional unit 218 via a request line 220 and a status line 222, and the functional unit 228 via a request line 226 and a status line 228. As will be appreciated, the integrated circuit 298 may contain only one functional unit or may contain a plurality of functional units for which it is desired to monitor and control power dissipation of the functional unit(s).

The power audit and control circuit 200 includes a power sensing circuit 230, a low power mode identifying circuit 232 and a low power mode circuit 234. The power sensing circuit 230 is, preferably, located proximate the functional unit 206 and functions to measure or estimate power dissipation of the functional unit 206. The low power mode identifying circuit 232 receives the measured or estimated power dissipation of the functional unit 206 and identifies the condition when the measured or estimated power dissipation exceeds a predetermined amount. The low power mode circuit 234 controls the power dissipation in the functional unit 206 in response the identified condition. It will be understood by those skilled in the art that the other functional units 212, 218, 224 will also include identical circuitry, or similar circuitry, performing the same functions (not shown), as the circuits 230, 232, 234 if it is desired for those functional units to include the power audit and control function of the present invention.

Each of the respective functional units 206, 212, 218, 224 monitors and controls its own power dissipation within the functional unit. As such, each unit can implement its own power dissipation savings easier and more efficiently than a central power dissipation control unit. That is, each particular functional unit 206, 212, 218, 224 tracks it own internal operations and power dissipation. This permits decentralization of the power dissipation reduction process. Each functional unit determines independently by its own methods and instructions when power dissipation within the functional unit is at an unacceptable level. Upon such a condition, the functional unit 206, 212, 218, 224 signals the unit availability tracker 204, via the respective status lines 210, 216, 222, 228, that the functional unit is operating in either a low power mode or a normal power mode. Accordingly, the instruction dispatch unit 202 knows whether the respective functional unit 206, 212, 218, 224 is operating in the low power mode or the normal power mode via the respective status line 210, 216, 222, 228.

The instruction dispatch unit 202 dispatches or routes an instruction or set of instructions to the appropriate functional unit 206, 212, 218, 224 depending on the desired operation to be performed. When a particular functional unit is in the low power mode (with its status line asserted) and the instruction dispatch unit 202 determines that the particular functional unit is required to perform the next operation, the instruction dispatch unit 202 asserts or activates the request line to the functional unit. When desired, an active request line can be used to override the low power mode and cause the functional unit to enter the normal mode. As will be appreciated, the request lines may be optional depending on the desired operation of the functional unit, such as during operations when throughput is critical and must be maintained regardless of the power dissipation level of the functional unit.

Figure 3:
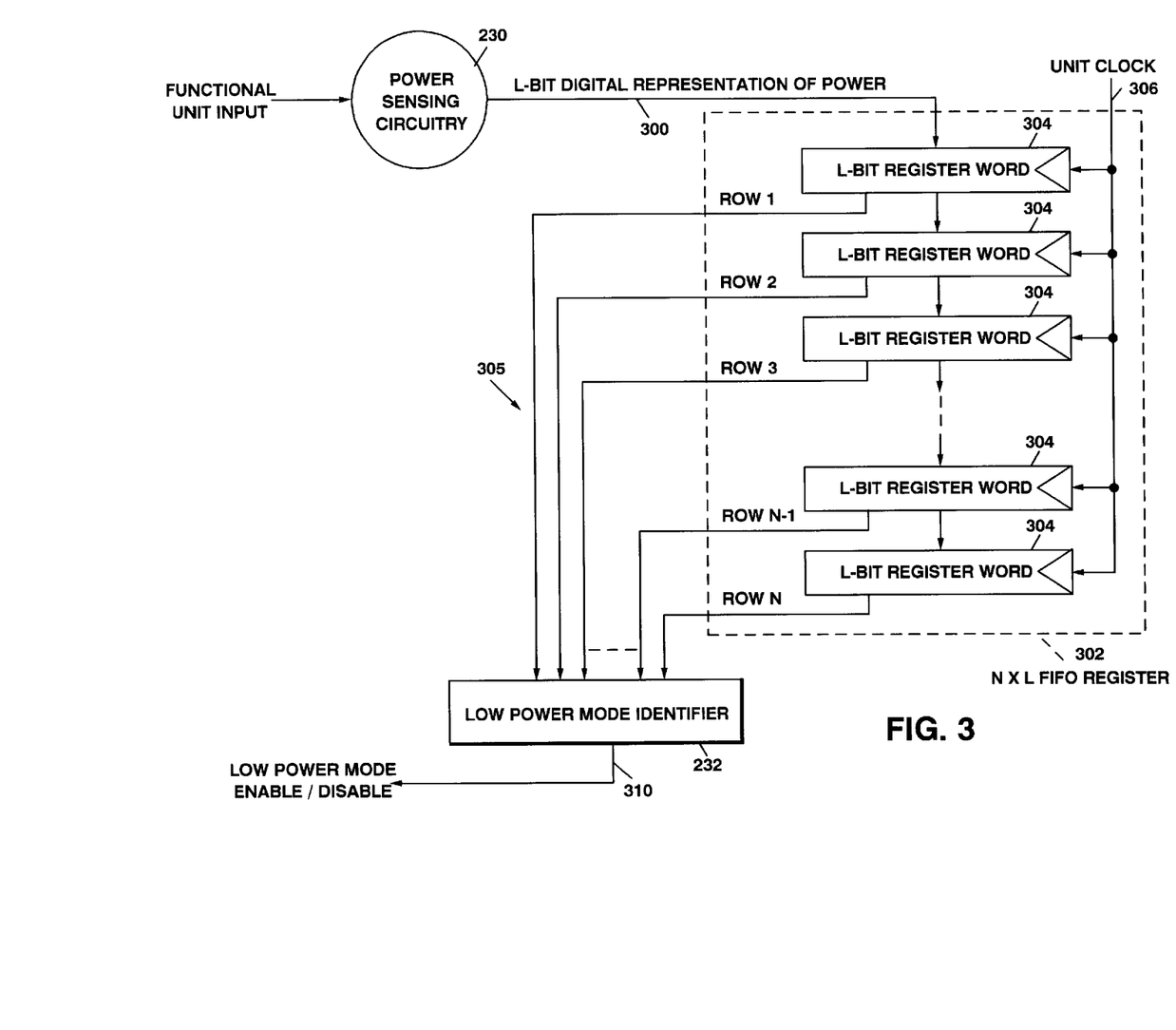
FIG. 3 is a block diagram illustrating the power sensing circuit and low power mode identifying circuit shown in FIG. 2.

Now referring to FIG. 3, there is shown the power sensing circuit 230 and the low power mode identifying circuit 232. The power sensing circuit 230 measures or estimates power dissipation of the functional unit 206. Hereafter, the terms "measure" and "estimate" are used interchangeably and, with respect to power, mean either measuring or estimating the power of the functional unit. As such, "measured power" is synonymous with "estimated power". The low power mode identifying circuit 232 receives the measured or estimated power and determines whether the functional unit is operating at an unacceptable level (i.e. dissipating too much power). If so, the low power mode identifying circuit 232 generates a low power mode enable signal 310.

In one embodiment, the power sensing circuit outputs an L-bit digital representation 300 of the measured power dissipation of the functional unit 206. As will be appreciated, the measured power may include either the average power over the current cycle (averaging the current across the cycle times the voltage), the average power calculated by the peak value and approximating the average, or simply the power measured consistently at a predetermined time during the cycle. The measured power 300, in a digital format, is input to a first-in first-out (FIFO) register 302 having N registers 304, with each register having L bits. After the power is measured and converted into the digital format 300, a unit clock signal 306 clocks the measured power into the first location (i.e. row one) of the FIFO register 302. At the next clock cycle, the power is sampled, and the measured current value is clocked into the first location (i.e. row one) with the previous value of the first register shifted one row down to the next register (i.e. row two). Power of the functional unit is measured for each clock cycle, with the FIFO register 302 always containing the measured power values of the last N cycles. As illustrated in FIG. 3, the low power mode identifying circuit receives the measured power dissipation values of the functional unit 206 over the last N cycles from the registers 304 via register bit lines 305. Using these values, the low power mode identifying circuit 232 "identifies" or determines whether the functional unit 206 should be placed into a low power mode. The low power mode identifying circuit 232 generates the low power mode enable signal when it is determined that too much power is being dissipated across the previous N contiguous cycles.

Figure 4:
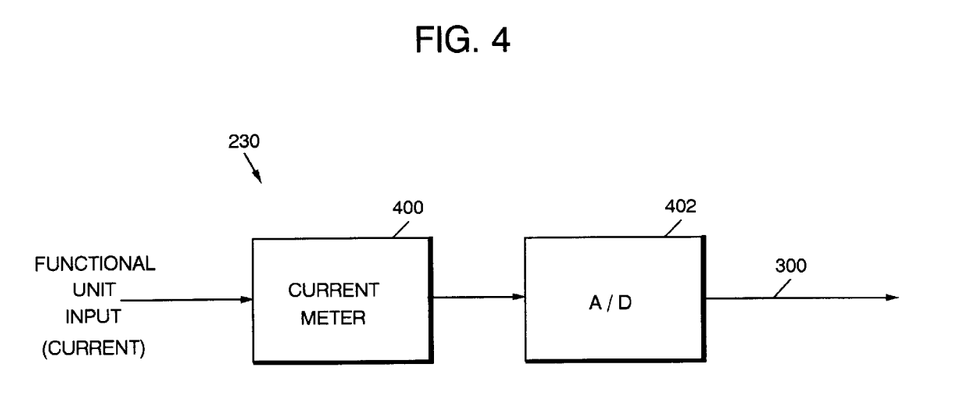
FIG. 4 is a more detailed block diagram of the power sensing circuit illustrated in FIG. 3.
Figure 5:
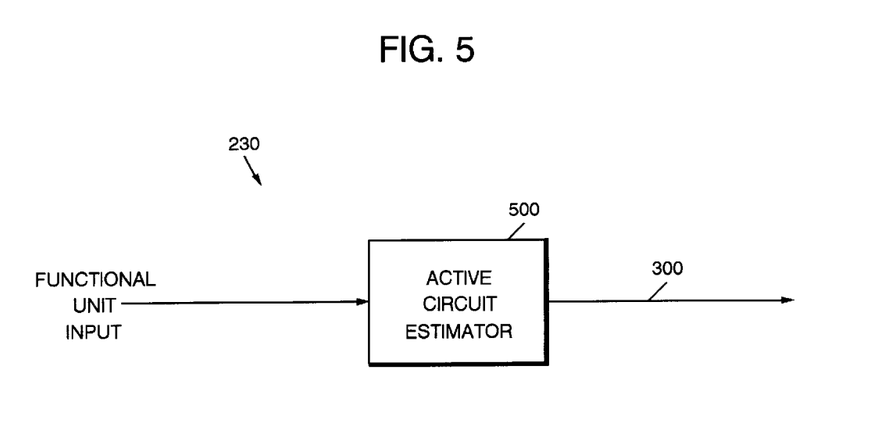
FIG. 5 is block diagram of an alternative embodiment of the power sensing circuit.

Now referring to FIGS. 4 and 5, there are illustrated two embodiments of the power sensing circuit 230. One embodiment is illustrated in FIG. 4 and includes a current meter 400 and an analog-to-digital (A/D) converter 402. In this embodiment, the current meter 400 is placed in the power supply line(s) to the functional unit 206. The current is then measured as described above, with the measured analog value converted to a digital format by the A/D converter 402. As will be appreciated, a simple method of measuring the power is to convert the measured current to a digital representation, thereby neglecting the voltage value of the supply lines. This may be satisfactory if the voltage value of the supply lines is maintained at a relatively constant value.

A more accurate approach will provide the A/D converter 402 with the capability to receive analog measurements of both current and supply voltage and generate a digital representation 300 of the measured power of the functional unit 206. A less complex method of measuring power dissipation of the functional unit is given in FIG. 5. In this alternative embodiment, the power sensing circuit 230 includes an active circuit estimator 500. The active circuit estimator 500 approximates the number of active circuits in a given cycle and generates the digital representation 300 of the power of the functional unit. The "active circuit estimator" is a power estimation circuit tuned to the individual functional unit. Based on each functional unit's known behavior (from design), power dissipation is approximated by averaging the known power (by design) across a finite number of active cycles for the functional unit. The "known power" is determined during the design process and is hard-coded (or may be programmable) into the "active circuit estimator" circuitry. A single value of known power can be used, or the values may vary based on a predicted operational fingerprint, operation code, etc.

Figure 6:
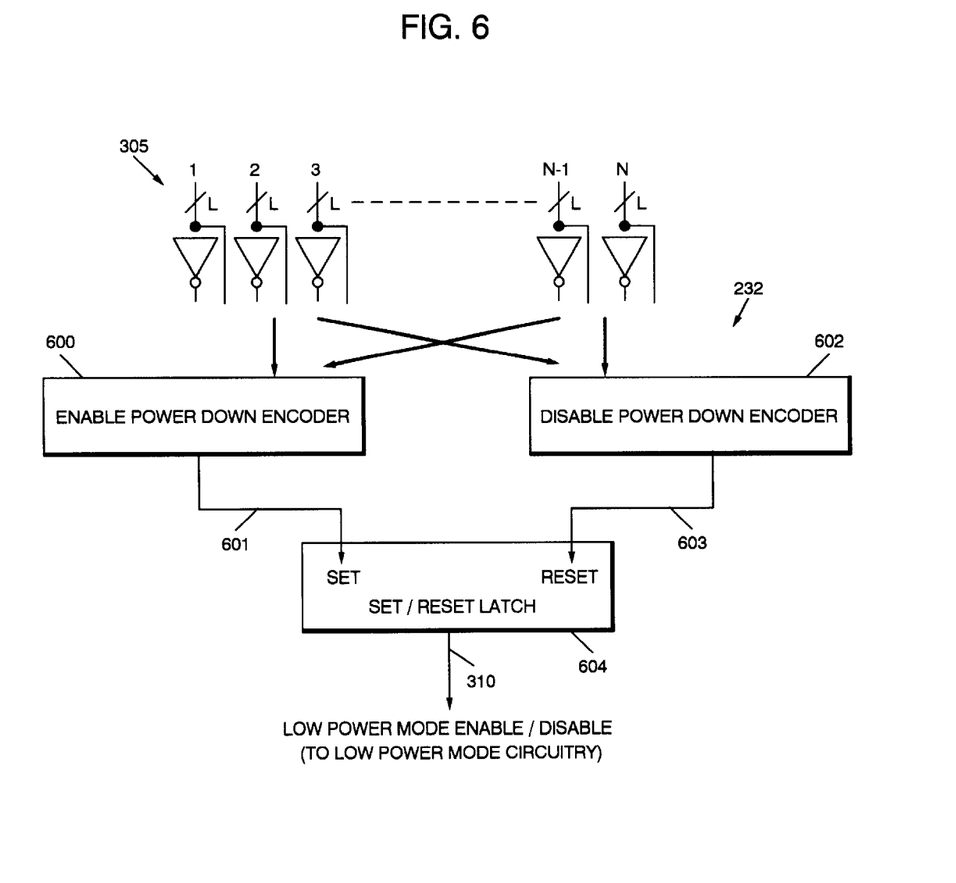
FIG. 6 is a more detailed illustration of the low power mode identifying circuit shown in FIG. 3.

Now referring to FIG. 6, there is shown a more detailed diagram of the low power mode identifying circuit 232. The low power mode identifying circuit 232 generates the low power mode enable signal 310 when the power dissipation of the functional unit 206 exceeds a predetermined amount. In one embodiment, the low power mode identifying circuit 232 receives the power dissipation values via the register bit lines 305 and includes a plurality of buffers 605 that provide true and complementary values for the contents of the registers 304 of the FIFO register 302 (shown in FIG. 3). The contents of the registers 304 are input to both an enable encoder 600 and a disable encoder 602. The enable encoder 600 generates a set signal 601 when the power dissipation values in the registers 304 exceed a predetermined amount, thereby indicating that the functional unit 206 is dissipating too much power. The disable encoder 602 generates a reset signal 603 when the power dissipation values in the registers 304 are below a predetermined amount.

Both the set signal 601 and the reset signal 603 are input to a set-reset (S/R) flip-flop 604. The enable encoder 600, the disable encoder 602 and the S/R flip-flop 604 function in combination to perform a hysteresis function. As such, a higher threshold value is required for generating the low power mode enable signal 310 than is required for deactivating the low power mode enable signal 310. This function permits a more advantageous "cooling" function. The S/R flip-flop 604 is set when the enable encoder 600 determines that the power dissipation is above a predetermined amount, thus necessitating a low power mode. In contrast, the S/R flip-flip 604 is reset when the disable encoder 602 determines that the power dissipation is below a predetermined amount, thus disabling the low power mode and allowing operation in a normal power mode.

For example, assume that the level of power dissipation of the functional unit 206 over N contiguous cycles can range on a scale from 0 to 10, with the value 8 being the value at which it is determined that too much power is being dissipated by the functional unit. Also assume that the value 6 is the value at which it is determined that the functional unit can resume normal operation. In this example, when the enable encoder 600 detects a high power condition (i.e. the value of the power dissipation exceeds 8), the low power mode enable signal 310 will be activated (normally, at this point the functional unit will go into a low power mode to reduce power dissipation). After some period of time in the low power mode, the measured power dissipation of the functional unit will be reduced. When the disable encoder 602 detects a low power condition (i.e. the value of the power dissipation falls below 6), the low power mode enable signal 310 will be deactivated. If both the enable encoder 600 and the disable encoder 602 operated at nearly the same threshold value, the reset function would most likely occur on the first cycle in the low power mode, thereby resuming the normal power mode after only a single cycle in the low power mode. It will be understood that other methods may be utilized as long as the basic desired function of enabling the power mode enable signal 310 is accomplished when the power dissipation of the functional unit exceeds a predetermined amount. (i.e. to prevent operation at levels of unacceptably high dissipation).

Figure 7A:
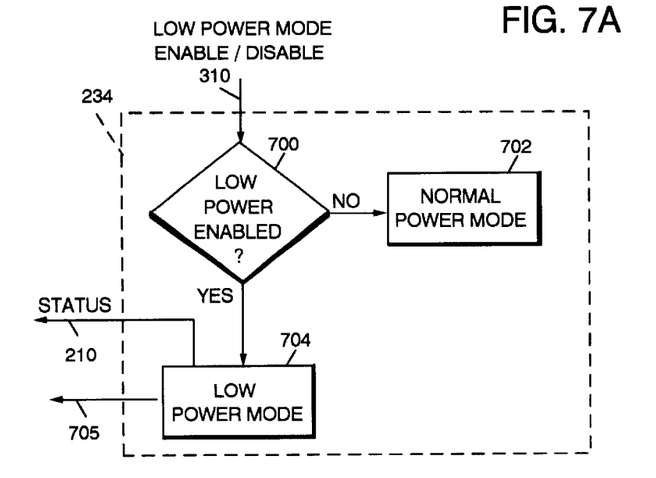
FIG. 7A is a logical diagram of the low power mode circuit shown in FIG. 2.
Figure 7B:
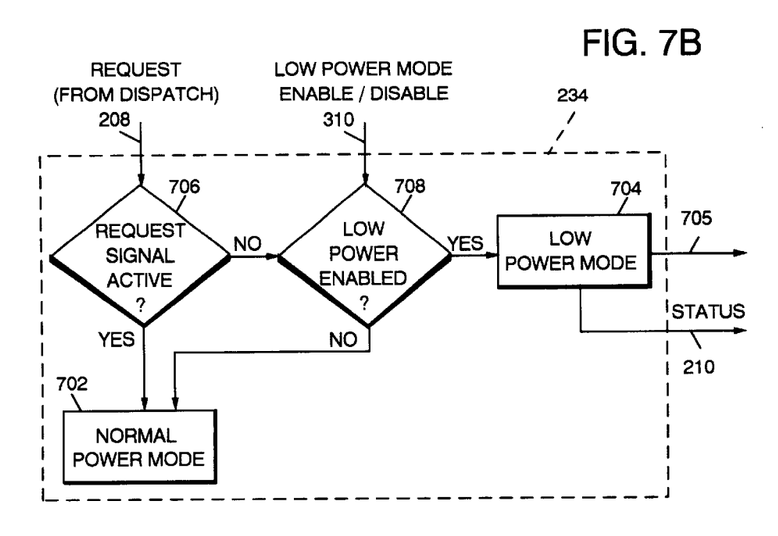
FIG. 7B is a logical diagram of a first alternative embodiment of the low power mode circuit.
Figure 7C:
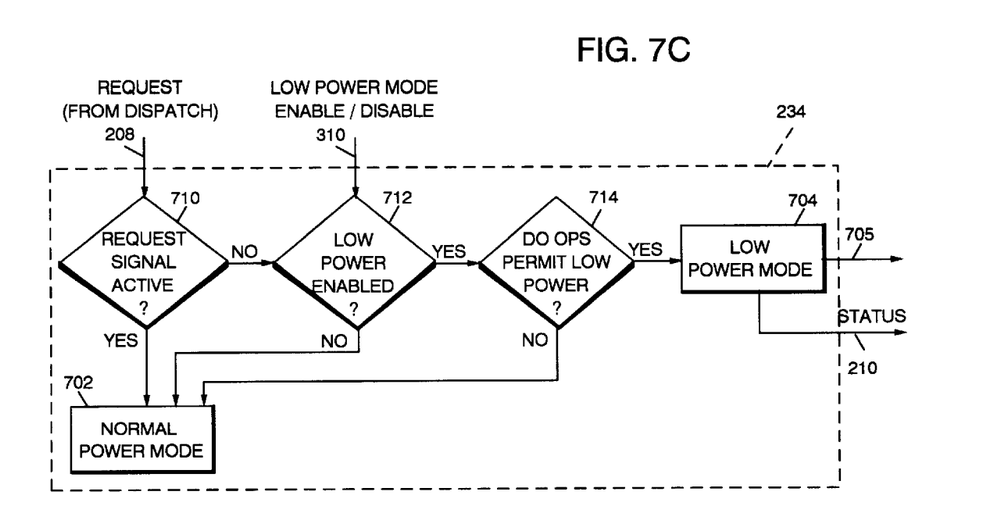
FIG. 7C is a logical diagram of a second alternative embodiment of the low power mode circuit.

Now referring to FIGS. 7A, 7B and 7C, there are shown logical diagrams for alternative embodiments of the low power mode circuit 234. In FIG. 7A, the low power mode circuit 234 receives the low power mode enable signal 310 and determines, at a step 700, whether the low power mode enable signal 310 is enabled. If not enabled, the functional unit 206 operates in a normal power mode 702. However, if enabled, the functional unit 206 enters a low power mode 704. Entrance into the low power mode 704 enables a low power mode signal 705, and further asserts the status line 210 (indicating the functional unit is in a low power mode). The status line 210 notifies the instruction dispatch unit 202 that the functional unit is in the low power mode 704. In this embodiment, the low power mode circuit 234 places the functional unit 206 into the low power mode 704 whenever the low power mode identifying circuit 232 indicates that the power dissipation has exceeded the threshold. The logical decision to enter the low power mode 704 is, therefore, dependent on the state of the low power mode enable signal 310. This approach maximizes possible power reduction by entering the low power mode 704 whenever the power dissipation exceeds the predetermined amount. However, it may decrease unit throughput since the functional unit may operate in the low power mode 704 without considering whether there are any pending instructions requiring execution.

A more complex approach is illustrated in FIG. 7B. The low power mode circuit 234 receives both the low power mode enable signal 310 and the request signal 208 as inputs. At a step 706, if the request signal 208 is active, the functional unit 206 operates in the normal power mode 702. However, if request signal is not active, the low power mode circuit 234 examines the low power mode enable signal 310 at a step 708. At this step 708, as in the step 700 in FIG. 7A, the low power mode circuit 234 places the functional unit 206 into the low power mode 704 when the low power mode enable signal 310 is enabled, with the resulting low power mode signal 705 and the status line 210 asserted (activated). Otherwise the functional unit 206 operates in the normal power mode 702. In the embodiment illustrated in FIG. 7B, the request line 208 "overrides" the low power mode enable signal 310 and forces the functional unit 206 to operate in the normal mode 702 regardless of the amount of power dissipation within the functional unit 206. This approach maximizes unit throughput but may reduce control over the power dissipation of the functional unit 206.

Another approach is illustrated in FIG. 7C. The low power mode circuit 234 examines the low power mode enable signal 310, the request signal 208, and whether the pending operations or instructions to be performed by the functional unit 206 are of a type that will allow the functional unit 206 to operate in the low power mode 704. At a step 710, if the request signal 208 is active, the functional unit 206 operates in the normal power mode 702. However, if the request signal 208 is not active, the low power mode circuit 234 examines the low power mode enable signal 310 at a step 712. If the low power mode enable signal 310 is enabled, the low power mode circuit 234 additionally examines, at a step 714, the type of operations or instructions currently being performed, or to be performed, by the functional unit 206. If they are of the type determined to be operable by the functional unit 206 in a low power mode, the functional unit 206 is placed in the low power mode 704. If not, the functional unit 206 is operated in the normal power mode 702. This approach permits more autonomy for the functional unit 206. The low power mode circuit 234 determines the best time to enter the low power mode based on ongoing internal operations, pending instructions, etc. This approach increases unit throughput.

It will be understood by those skilled in the art that the embodiments set forth in FIGS. 7A, 7B and 7C are merely illustrative of the possible decisional processes followed by the low power mode circuit 234 in determining whether to enter the low power mode. As will be appreciated, numerous other embodiments dependent on other inputs may be designed. Further, many different circuits may be designed by those skilled in the art to carry out the functions illustrated in FIGS. 7A, 7B and 7C. The low power mode circuit 234 functions to determine when the functional unit 206 should enter the low power mode to reduce power dissipation. In addition, on any given integrated circuit design, one or more techniques of power dissipation control as described above may be implemented for different functional units on the integrated circuit. Some functional units may be less critical to overall throughput than others which may allow a simple implementation over more critical ones.

Figure 8:
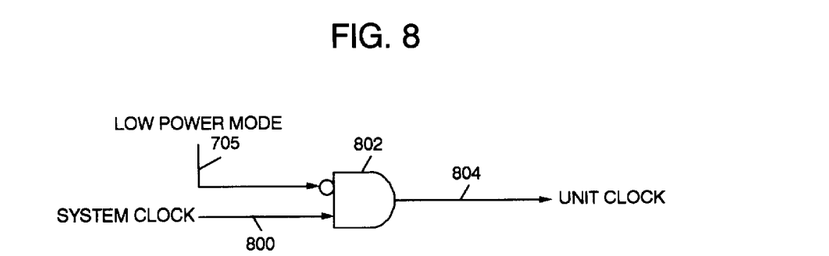
FIG. 8 illustrates circuitry of the low power mode circuit for implementing operation in a low power mode.
Figure 9:
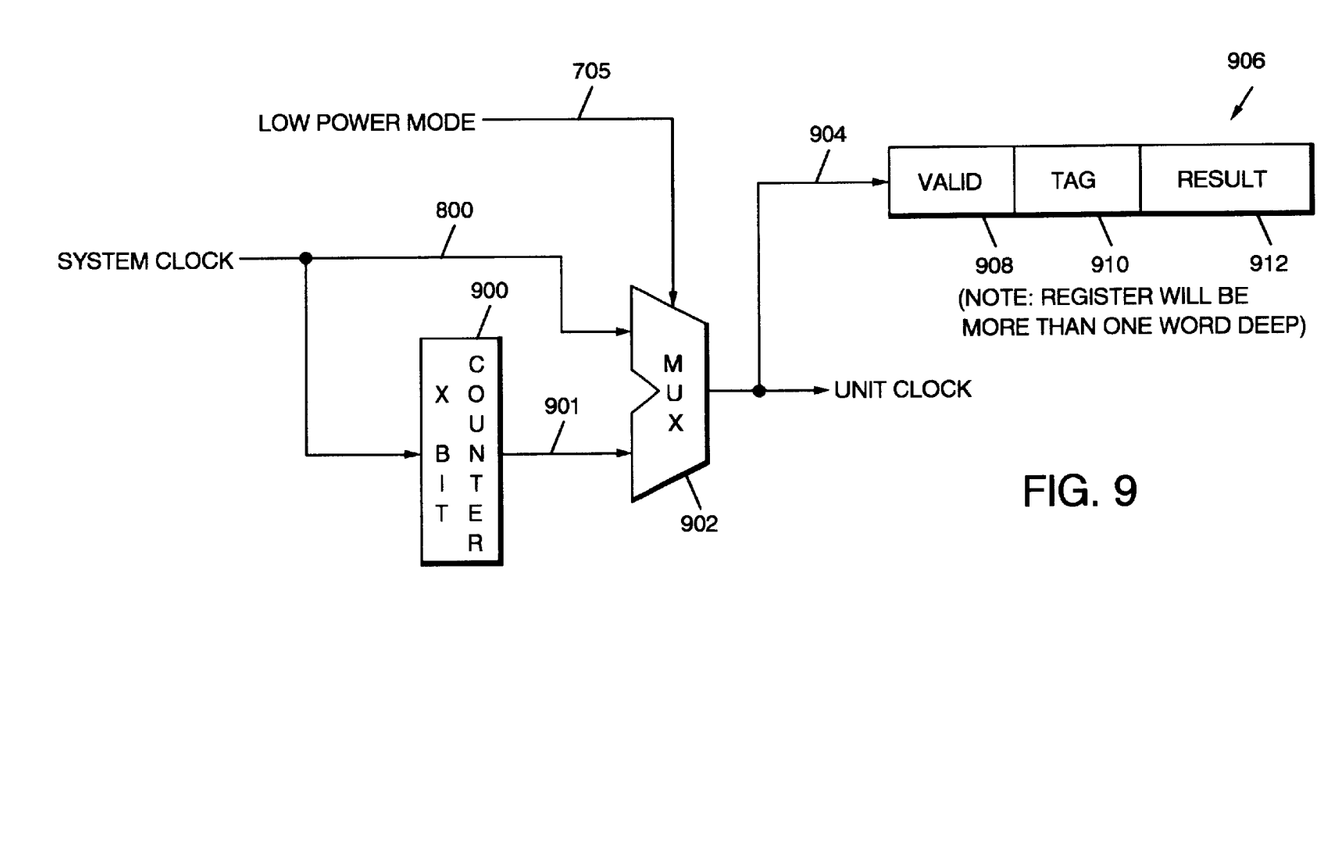
FIG. 9 illustrates alternative circuitry of the low power mode circuit for implementing operation in the low power mode.

Now referring to FIGS. 8 and 9, there is illustrated circuitry of the low power mode circuit 234 for implementing the low power mode 704. In the first embodiment shown in FIG. 8, the low power mode circuit 234 disables the functional unit 206. Normally, the functional unit 206 operates in accordance with a system clock 800. The inversion of the low power mode signal 705 and the system clock 800 are input to an AND gate 802 that generates a unit clock 804. The functional unit 206 operates in accordance with the unit clock 804 instead of the system clock 800. The unit clock 804 operates at the same clock speed as the system clock 800 except when the low power mode signal 705 is enabled. The low power mode signal 705 disables the unit clock 804. The embodiment illustrated in FIG. 8 functions to disable the functional unit 206 during the low power mode. As such, the low power mode disables the functional unit 206 by terminating the unit clock 804 of the functional unit 206.

The method of low power mode operation illustrated in FIG. 9 reduces the clock speed of the functional unit 206. The clock speed is reduced by multiplexing a counter 900 into the path of the system clock 800. The counter 900 performs a divide function to generate a second clock 901 that operates at a clock speed that is less than the clock speed of the system clock 800. The divide by factor "x" may be programmable and/or can be set internally or externally to the functional unit 206. Both the system clock 800 and the second clock 901 are input to a multiplexer 902. The low power mode signal 705 is used to select the second clock when the low power mode signal 705 is enabled. The multiplexer 902 outputs a unit clock 904 that is used to operate the functional unit 206. In this embodiment of the low power mode, the clock speed of the clock is reduced but the functional unit 206 is still operating (only at a slower speed). This reduces the average power dissipation of the functional unit 206 and allows continued operation of the functional unit 206 while in the low power mode. When the low power mode identifying circuit 232 indicates that normal operation is permitted (via the low power mode enable signal 310 and the low power mode signal 705), the multiplexer 902 selects the system clock 800 and the unit clock 904 resumes its normal clock speed.

As will be appreciated, low power mode operation in accordance with this method operates the functional unit 206 at a different clock speed than the overall system. Thus, the functional unit may lose its synchronization with other functional units on the integrated circuit 298. In order to alleviate any potential synchronization problem, inter-unit communication channels may include a completion indicator 908, tag address 910, and result buffer 912 for each internal operation. This allows the instruction dispatch unit 202 to determine which operations/instructions have been completed by a cache/cam type method.

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. A power audit and control circuit for monitoring and controlling power dissipation of functional units within a microprocessor on an integrated circuit, comprising:

a power sensing circuit fabricated on the integrated circuit and located proximate a functional unit for measuring or estimating power dissipation of the functional unit;

a low power mode identifying circuit fabricated on the integrated circuit receiving the measured or estimated power dissipation of the functional unit and generating a low power mode enable signal when the measured or estimated power dissipation exceeds a predetermined amount;

an instruction dispatch unit generating a request signal when the instruction dispatch unit receives an instruction for instructing the functional circuit to perform an operation;

circuitry for controlling the power dissipation in the functional unit by placing the functional circuit into a low power mode or a normal power mode in response to the low power mode enable signal and the request signal and for generating a status signal indicating the functional unit is operating in the normal power mode.

2. The power audit and control circuit in accordance with claim 1 wherein the circuitry places the functional circuit into the low power mode in response to the low power mode enable signal.

3. The power audit and control circuit in accordance with claim 1 wherein the circuitry overrides the low power mode enable signal when present and places the functional circuit into the normal power mode when the request signal is present.

4. The power audit and control circuit in accordance with claim 1 wherein the circuitry places the functional circuit into the low power mode in response to the absence of the request signal, the present of the low power mode enable signal, and a determination that a requested operation of the functional unit is capable of being performed in the low power mode.

5. The power audit and control circuit in accordance with claim 1 wherein the power sensing circuit comprises:

a current meter placed in a supply line to the functional unit; and an analog-to-digital converter for converting the measured current into a digital format representing the measured power dissipation of the functional unit.

6. The power audit and control circuit in accordance with claim 5 wherein the power sensing circuit further comprises a FIFO register having a plurality of registers with each register having n bits, the FIFO register periodically receiving the measured power dissipation in the functional unit.

7. The power audit and control circuit in accordance with claim 6 wherein the measured power dissipation values in each of the plurality of registers within the FIFO register is input to the low power mode identifying circuit for generating a low power mode enable signal when the measured power dissipation of the functional circuit exceeds a predetermined amount.

8. The power audit and control circuit in accordance with claim 1 wherein the functional unit is disabled in the low power mode.

9. The power audit and control circuit in accordance with claims 1 wherein the functional unit operates at a lower clock frequency in the low power mode.

10. A method for reducing power dissipation in a functional unit on an integrated circuit comprising the steps of:

measuring power dissipation of the functional unit;

comparing the measured power dissipation to a predetermined value;

generating a low power mode enable signal when the measured power dissipation exceeds the predetermined value; and reducing power dissipation of the functional unit in response the low power mode enable signal.

11. The method in accordance with claim 10 wherein the step of reducing power dissipation includes the step of placing the functional unit into a low power mode.

12. The method in accordance with claim 11 further comprising the steps of:

operating the functional unit at a first clock speed when in a normal power mode; and operating the functional unit at a second clock speed when in the low power mode, the second clock speed lower than the first clock speed.

13. The method in accordance with claim 10 further including the step of overriding the low power mode enable signal and placing the functional unit into a normal power mode.

14. The method in accordance with claim 10 wherein the functional unit includes a power supply line for supplying power to the functional unit, and the step of measuring the power dissipation of the functional unit includes the step of measuring the power supplied to the functional unit through the power supply line.

* * * * *